United States Patent [19]
Sanford

[11] Patent Number: 5,558,422
[45] Date of Patent: Sep. 24, 1996

[54] DECORATIVE FIBER OPTIC LIGHT

[76] Inventor: Jeffrey M. Sanford, 320 W. Kendall Dr., Yorkville, Ill. 60560

[21] Appl. No.: 503,281

[22] Filed: Jul. 17, 1995

[51] Int. Cl.⁶ ........................................ F21P 1/02
[52] U.S. Cl. .................. 362/32; 362/123; 362/806; 362/191
[58] Field of Search .................. 362/32, 183, 123, 362/122, 806, 320, 802, 276, 190, 191; 428/18, 19, 10

[56] References Cited

U.S. PATENT DOCUMENTS

| | | | |
|---|---|---|---|
| 3,163,573 | 12/1964 | Brooks | 362/123 |
| 3,465,139 | 9/1969 | Siegal | 362/123 |
| 3,564,233 | 2/1971 | Cox et al. | 362/32 |
| 4,068,118 | 1/1978 | Carrington | 362/123 |
| 4,364,102 | 12/1982 | Huppert et al. | 362/123 |
| 5,104,608 | 4/1992 | Pickering | 362/32 |
| 5,422,797 | 6/1995 | Shattan | 362/32 |

Primary Examiner—Denise L. Gromada
Assistant Examiner—Thomas M. Sember

[57] ABSTRACT

A light for providing illuminated holiday decorations. The inventive device includes a fiber optic light string having a plurality of elongated optical radiators extending from a fiber optic cable. A light assembly generates illumination for dispensing through the fiber optic cable and projecting optical radiators. The light string can be incorporated into decorative garland, a wreath, or a Christmas tree structure.

6 Claims, 4 Drawing Sheets

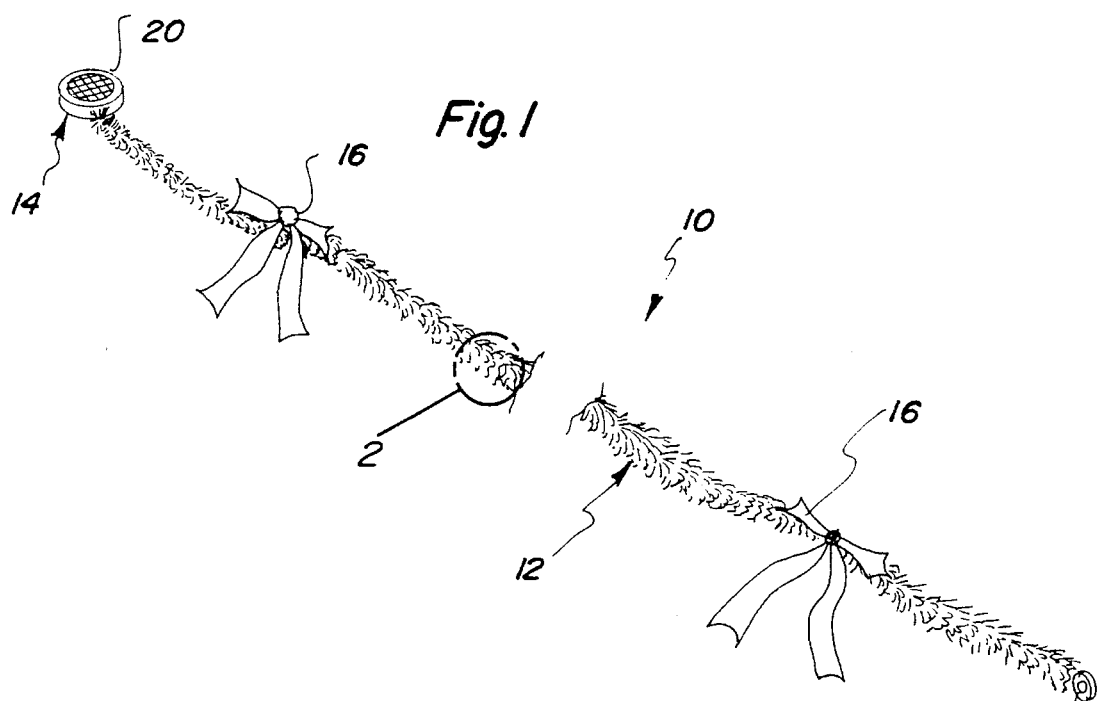
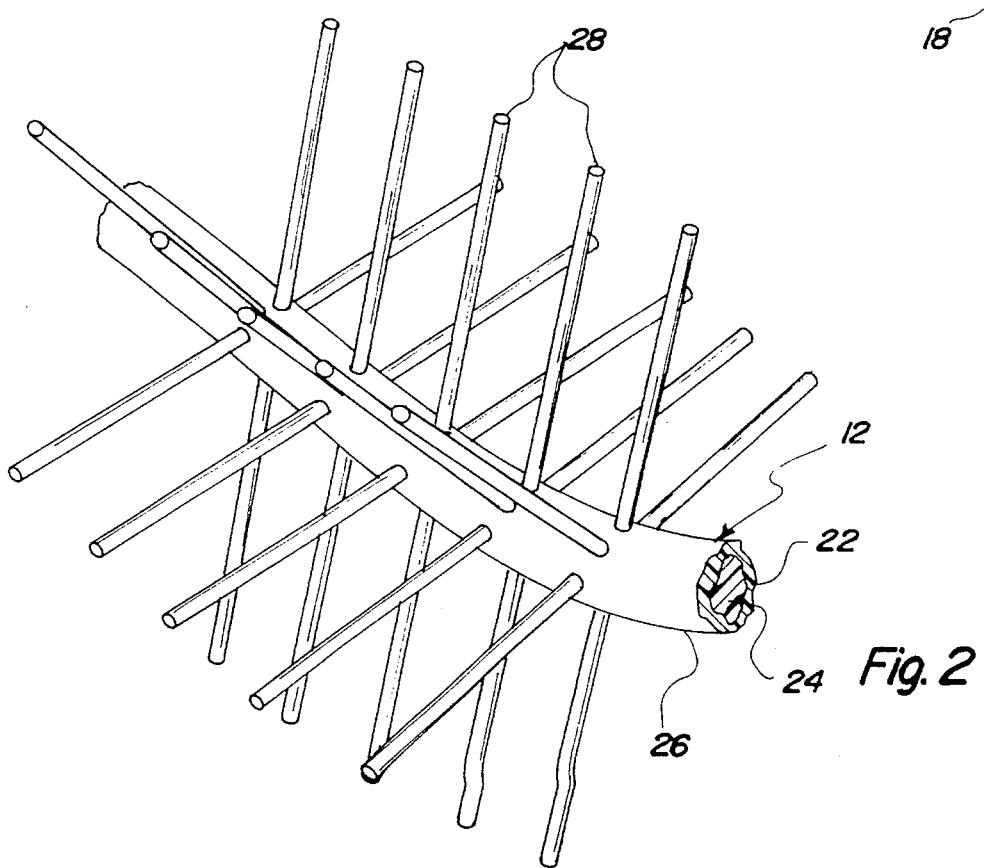

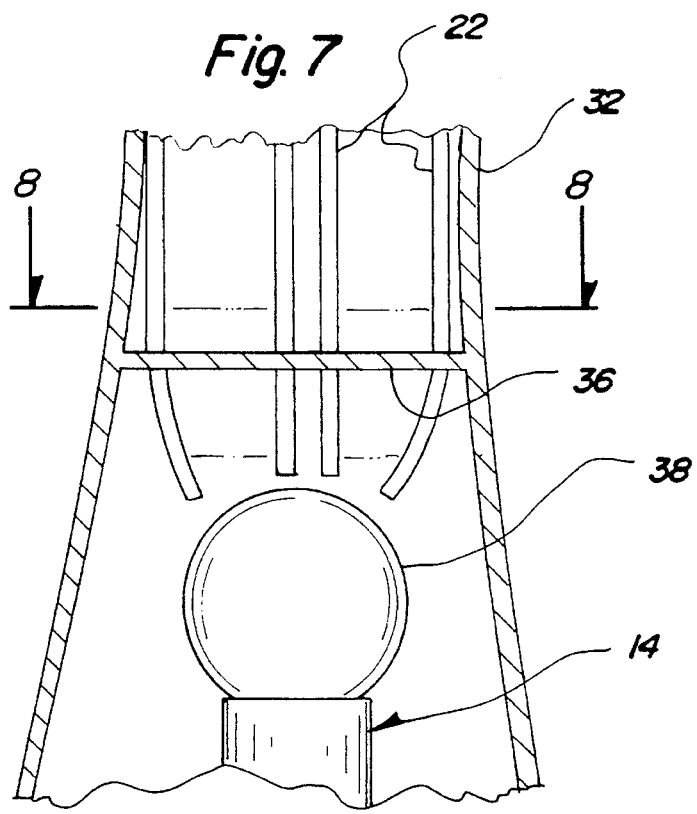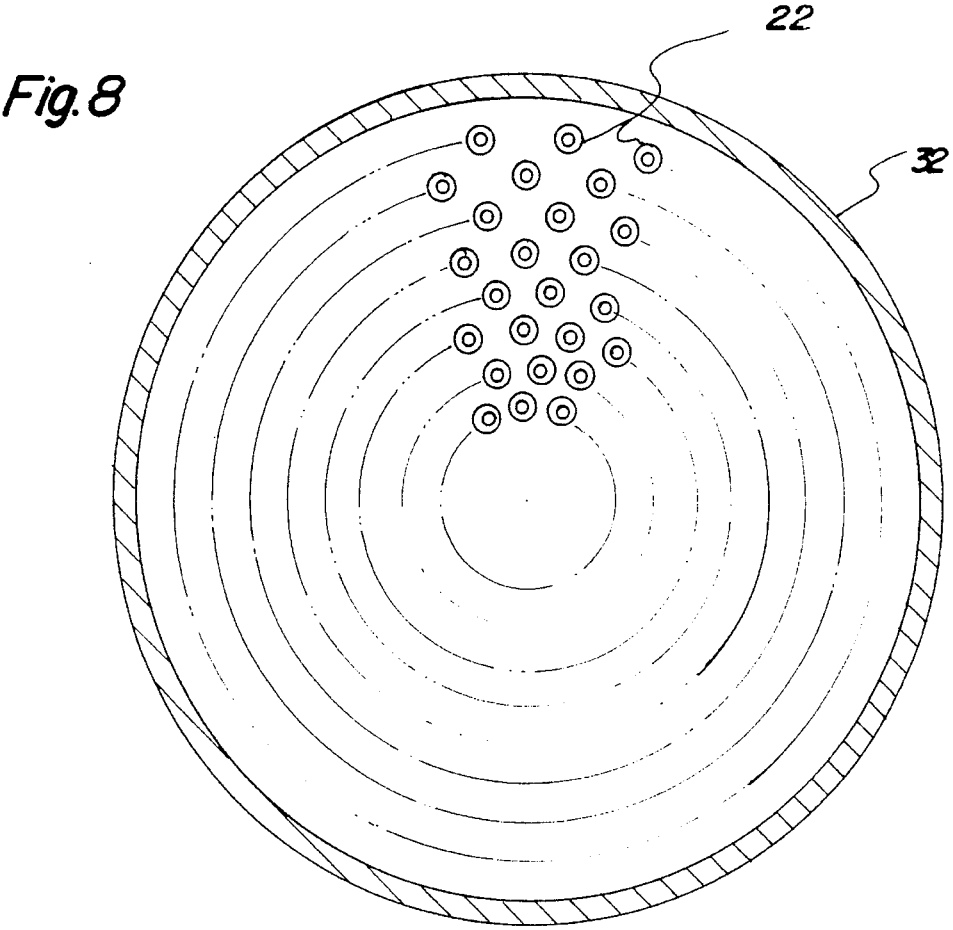

DECORATIVE FIBER OPTIC LIGHT

BACKGROUND OF THE INVENTION

1. Field of the Invention

The present invention relates to illumination structures and more particularly pertains to a decorative fiber optic light for providing illuminated holiday decorations.

2. Description of the Prior Art

The use of illumination structures is known in the prior art. More specifically, illumination structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art illumination structures include U.S. Pat. No. 5,094,893; U.S. Pat. No. 4,516,193; U.S. Pat. No. 5,085,901; U.S. Pat. No. 4,172,913; U.S. Pat. No. 4,968,541; and U.S. Design Pat. No. 325,887.

While these devices fulfill their respective, particular objectives and requirements, the aforementioned patents do not disclose a decorative fiber optic light for providing illuminated holiday decorations which includes a fiber optic light string having a plurality of elongated optical radiators extending from a fiber optic cable, and a light assembly generating illumination for dispensing through the fiber optic cable and projecting optical radiators, wherein the light string can be incorporated into decorative garland, a wreath, or a Christmas tree structure.

In these respects, the decorative fiber optic light according to the present invention substantially departs from the conventional concepts and designs of the prior art, and in so doing provides an apparatus primarily developed for the purpose of providing illuminated holiday decorations.

SUMMARY OF THE INVENTION

In view of the foregoing disadvantages inherent in the known types of illumination structures now present in the prior art, the present invention provides a new decorative fiber optic light construction wherein the same can be utilized for providing illuminated holiday decorations. As such, the general purpose of the present invention, which will be described subsequently in greater detail, is to provide a new decorative fiber optic light apparatus and method which has many of the advantages of the illumination structures mentioned heretofore and many novel features that result in a new decorative fiber optic light which is not anticipated, rendered obvious, suggested, or even implied by any of the prior art illumination structures, either alone or in any combination thereof.

To attain this, the present invention generally comprises a light for providing illuminated holiday decorations. The inventive device includes a fiber optic light string having a plurality of elongated optical radiators extending from a fiber optic cable. A light assembly generates illumination for dispensing through the fiber optic cable and projecting optical radiators. The light string can be incorporated into decorative garland, a wreath, or a Christmas tree structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative fiber optic light apparatus and method which has many of the advantages of the illumination structures mentioned heretofore and many novel features that result in a decorative fiber optic light which is not anticipated, rendered obvious, suggested, or even implied by any of the prior art tool guides, either alone or in any combination thereof.

It is another object of the present invention to provide a new decorative fiber optic light which may be easily and efficiently manufactured and marketed.

It is a further object of the present invention to provide a new decorative fiber optic light which is of a durable and reliable construction.

An even further object of the present invention is to provide a new decorative fiber optic light which is susceptible of a low cost of manufacture with regard to both materials and labor, and which accordingly is then susceptible of low prices of sale to the consuming public, thereby making such decorative fiber optic light economically available to the buying public.

Still yet another object of the present invention is to provide a new decorative fiber optic light which provides in the apparatuses and methods of the prior art some of the advantages thereof, while simultaneously overcoming some of the disadvantages normally associated therewith.

Still another object of the present invention is to provide a new decorative fiber optic light for providing illuminated holiday decorations.

Yet another object of the present invention is to provide a new decorative fiber optic light which includes a fiber optic light string having a plurality of elongated optical radiators extending from a fiber optic cable, and a light assembly generating illumination for dispensing through the fiber optic cable and projecting optical radiators, wherein the light string can be incorporated into decorative garland, a wreath, or a Christmas tree structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a first form of a decorative fiber optic light according to the present invention.

FIG. 2 is an enlarged isometric view of the area set forth in FIG. 1.

FIG. 7 is a cross-sectional view taken along line 7—7 of FIG. 5.

FIG. 8 is a cross-sectional view taken along line 8—8 of FIG. 7.

DESCRIPTION OF THE PREFERRED EMBODIMENT

Figure 3:
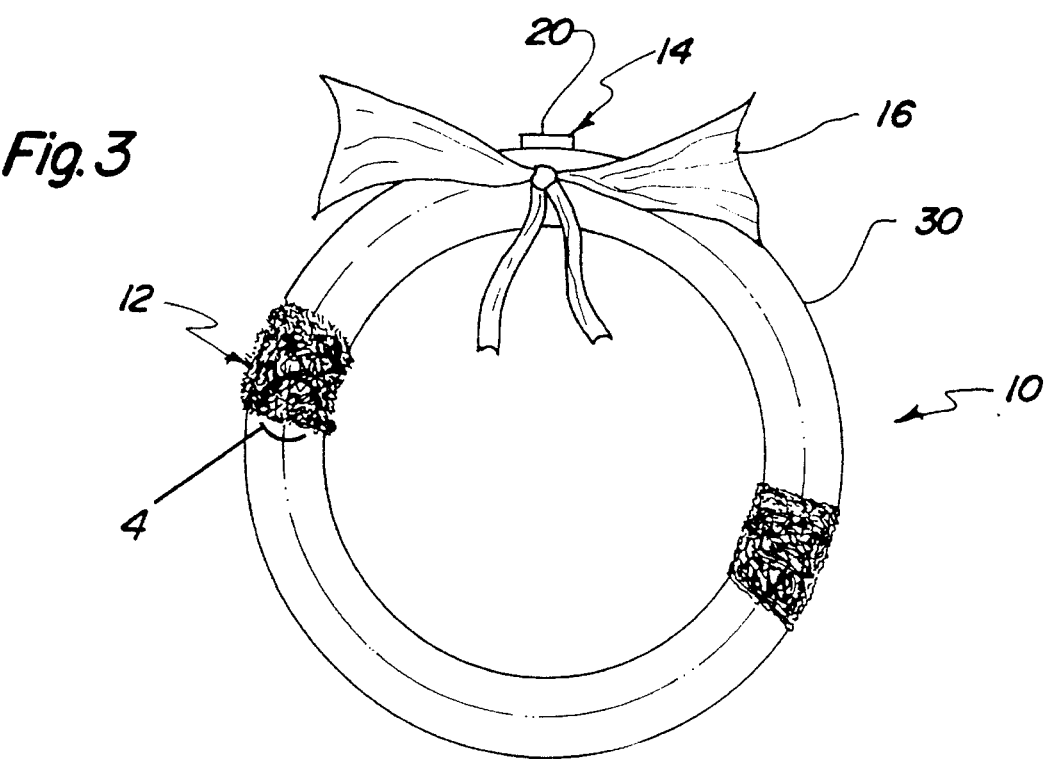
FIG. 3 is an elevation view of a second form of a decorative fiber optic light according to the present invention.

With reference now to the drawings, and in particular to FIGS. 1–8 thereof, a new decorative fiber optic light embodying the principles and concepts of the present invention and generally designated by the reference numeral 10 will be described.

More specifically, it will be noted that the decorative fiber optic light 10 may take the form of a holiday decoration simulating an elongated strand of garland, as shown in FIG. 1 of the drawings. The invention 10 comprises a fiber optic light string 12 extending from a light means 14 provided for generating illumination dispensed through the fiber optic light string during use of the device 10. If desired, a plurality of decorative bows 16 can be secured to the fiber optic light string 12 to further augment the decorative effect of the device 10. Preferably, the light means 14 is mounted to a first end of the fiber optic light string 12, with a mounting ring 18 being mounted to a second end of the fiber optic light string so as to permit securement of the second end relative to a supporting structure such as a vertical wall or the like. A solar panel 20 can be incorporated into the light means 14 for effecting electrical charging of batteries of the light means in response to an impinging of light upon the solar panel 20 during daylight hours.

As shown in FIG. 2, the fiber optic light string 12 of the present invention 10 preferably comprises a fiber optic cable 22 including a transparent core 24 encapsulated by a reflective casing 26. A plurality of elongated optical radiators 28 extend from the fiber optic cable 22 and are directed through the reflective casing 26 into optical communication with the transparent core 24. By this structure, illumination directed through the transparent core 24 of the fiber optic cable 22 will be subsequently radiated by the elongated optical radiators 28. Preferably, the elongated optical radiators 28 comprise a substantially transparent or translucent material formed into an elongated and linear rod. The elongated optical radiators 28 are preferably oriented in spaced pluralities, with each plurality of optical radiators being radially spaced about the fiber optic cable 22 and residing within a common plane. The spaced pluralities of the elongated optical radiators 28 are best preferably positioned in a substantially spaced and parallel orientation along the length of the fiber optic cable 22.

Figure 4:
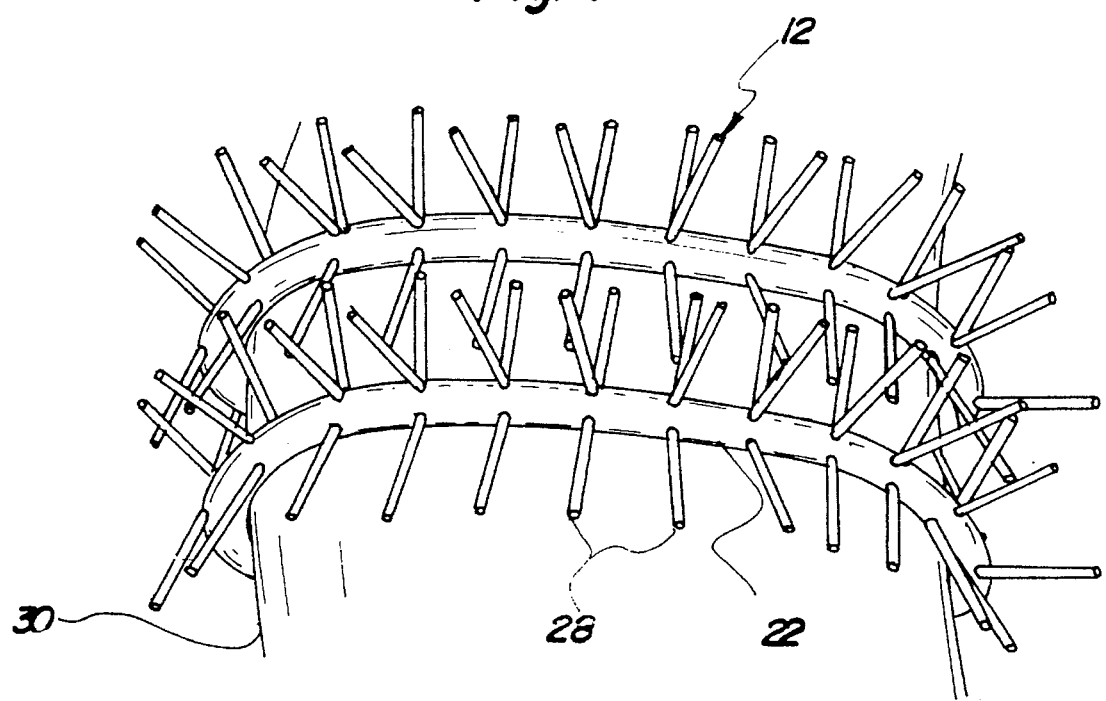
FIG. 4 is an enlarged isometric illustration of the area set forth in FIG. 3.
Figure 5:
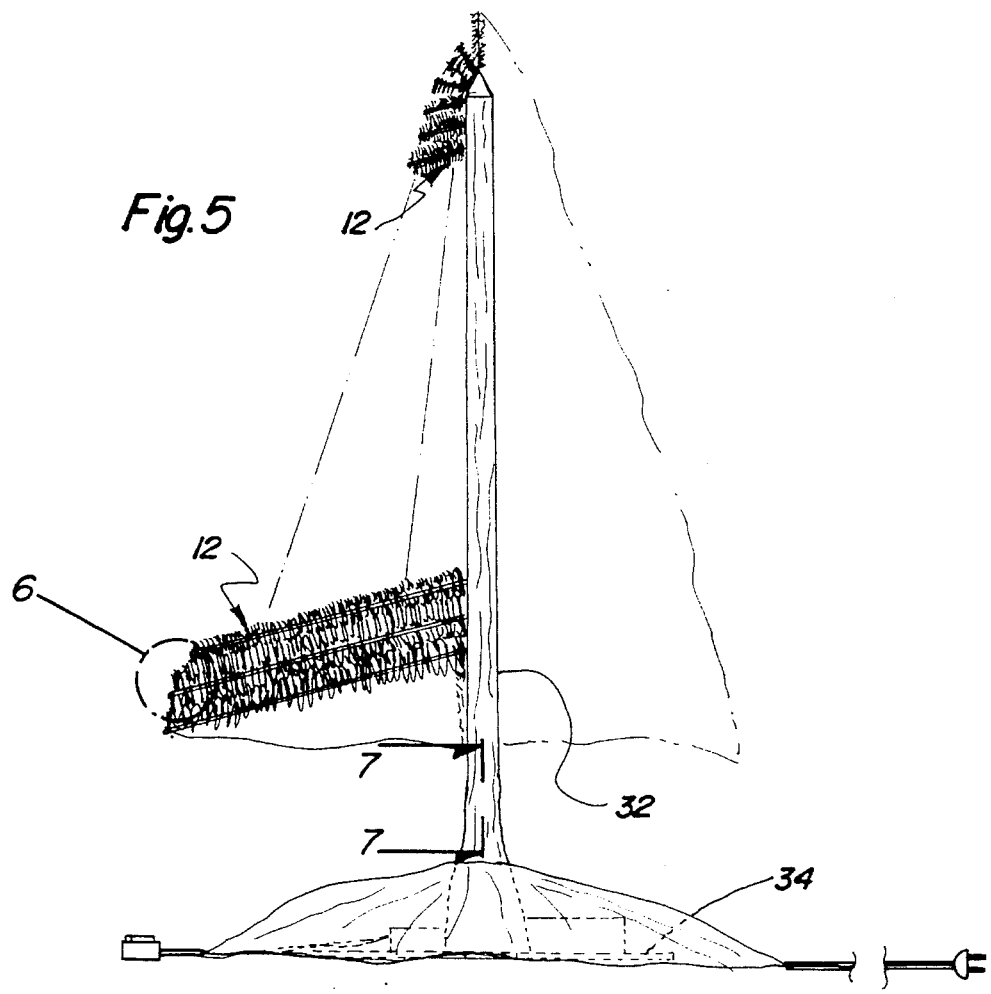
FIG. 5 is an elevation view of a third form of a decorative fiber optic light according to the present invention.
Figure 6:
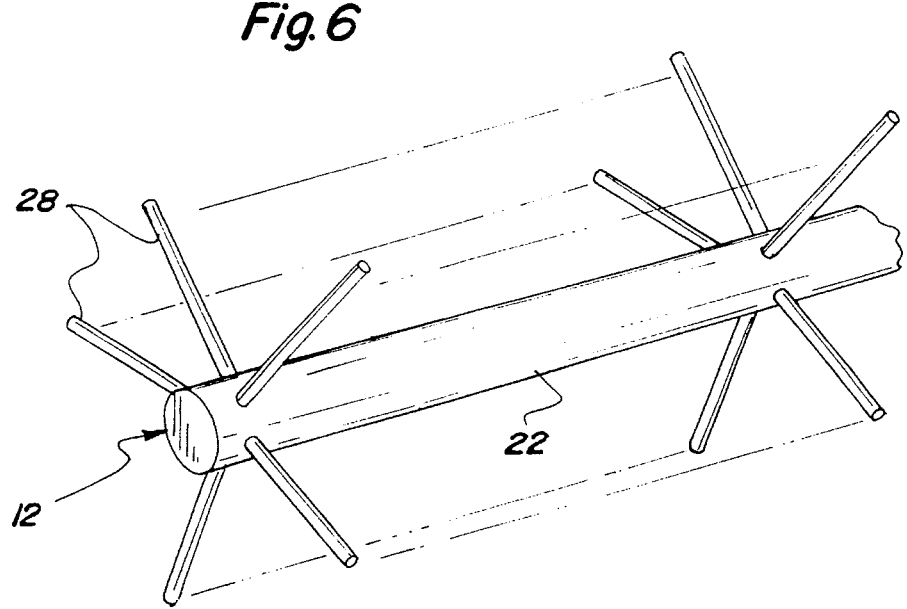
FIG. 6 is an enlarged isometric view of the area set forth in FIG. 5.

Referring now to FIG. 3, it can be shown that the present invention 10 may take the form of a wreath including an annular form 30 about which the fiber optic light string 12 is spirally wound. A decorative bow 16 can be secured to an upper portion of the annular form 30 as shown in FIG. 3 of the drawings. The light means 14 is preferably positioned along an upper portion of the annular form 30 so as to receive light upon the solar panel 20 thereof. As shown in FIG. 4, the fiber optic cable 22 of the fiber optic light string 12 is wrapped about the annular form 30, with the elongated optical radiators 28 projecting therefrom.

Referring now to FIGS. 5 through 8, it can be shown that the present invention 10 may take the form of a Christmas tree comprising a center stanchion 32 supported in a substantially orthogonal orientation relative to a ground surface by a base member 34. In this form of the invention 10, a plurality of fiber optic light strings 12 extend through the center stanchion 32 and project outwardly therefrom. The fiber optic light strings 12 are supported by projecting rods, wires, or the like so as to extend into the orientation illustrated in FIG. 5 with respect to the center stanchion 32. Alternatively, the fiber optic cable 22 of the fiber optic light strings 12 can be formed of a substantially rigid material so as to project into the orientation illustrated in FIG. 5. Referring to FIGS. 7 and 8, each of the fiber optic cables 22 extend through the center stanchion 32 and through a support plate 36 to terminate proximal to a light bulb 38 of the light means 14. By this structure, illumination of the light means 14 will effect a generation of light conveyed through the fiber optic cable 22 and dispensed through the elongated optical radiators 28 to provide a decorative effect. If desired, the light means 14 can be powered by an electrical power cord extending therefrom and couplable with a conventionally known household power outlet. Further, a CD player, a power surge protector, a mini computer controlling the light means 14, and a dimmer switch can be provided and electrically coupled to the device 10.

In reference to the light means 14, it is to be understood that the light means may comprise any conventionally known source of illumination. However, the preferred light means 14 of the present invention 10 includes a conventionally known light bulb of incandescent design electrically coupled or electrically couplable to a power source such as the solar panel 20 and unillustrated batteries.

In use, the decorative fiber optic light 10 of the present invention can be easily utilized to provide illuminated holiday decorations as desired by an end user. The fiber optic light string 12 incorporated into the various forms of the present invention 10 provides a symmetrical and therefore continuous radiation of light along a longitudinal width thereof. If desired, a plurality of light means 14 can be utilized in conjunction with the fiber optic light strings 12 to provide for illumination of light strings of various lengths.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A decorative fiber optic light comprising:

a light means for generating illumination;

a fiber optic light string extending from the light means;

wherein the fiber optic light string comprises a fiber optic cable including a transparent core encapsulated by a reflective casing; and a plurality of elongated optical radiators extending from the fiber optic cable and directed through the reflective casing into optical communication with the transparent core such that illumination directed through the transparent core of the fiber optic cable will radiate through the elongated optical radiators;

wherein the elongated optical radiators each comprise a substantially transparent material formed into an elongated linear rod;

wherein the elongated optical radiators are oriented in spaced pluralities, with each plurality of optical radiators being radially spaced about the fiber optic cable and residing within a common plane;

wherein the spaced pluralities of the elongated optical radiators are positioned in a substantially spaced and parallel orientation relative to one another along the length of the fiber optic cable;

wherein the light means is mounted to a first end of the fiber optic light string;

and further comprising a mounting ring secured to a second end of the fiber optic light string so as to permit securement of the second end relative to a supporting structure.

2. The decorative fiber optic light of claim 1, wherein the light means includes a solar panel.

3. The decorative fiber optic light of claim 2, wherein the light is in the form of a wreath including an annular form, with the fiber optic light string being helically wound about the annular form; and further comprising a decorative bow secured to an upper portion of the annular form.

4. The decorative fiber optic light of claim 3, wherein the light means is positioned along an upper portion of the annular form.

5. The decorative fiber optic light of claim 2, wherein the light is in the form of a Christmas tree and includes a plurality of fiber optic light strings, the Christmas tree comprising a center stanchion; a base member secured to the center stanchion so as to support the center stanchion in a substantially orthogonal orientation relative to a ground surface; with the plurality of fiber optic light strings extending through the center stanchion and projecting outwardly therefrom through longitudinally spaced apertures directed through the center stanchion, the fiber optic light strings being supported so as to project outwardly and at an oblique angle from the center stanchion.

6. A decorative fiber optic light comprising:

a light means for generating illumination;

a fiber optic light string extending from the light means;

wherein the fiber optic light string comprises a flexible fiber optic cable including a transparent core encapsulated by a reflective casing; and a plurality of elongated optical radiators extending from the fiber optic cable and directed through the reflective casing into optical communication with the transparent core such that illumination directed through the transparent core of the fiber optic cable will radiate through the elongated optical radiators;

wherein the elongated optical radiators each comprise a substantially transparent material formed into an elongated linear rod;

wherein the light means is mounted to a first end of the fiber optic light string;

and further comprising a mounting ring secured to a second end of the fiber optic light string so as to permit securement of the second end relative to a supporting structure.

* * * * *